Figure 1:
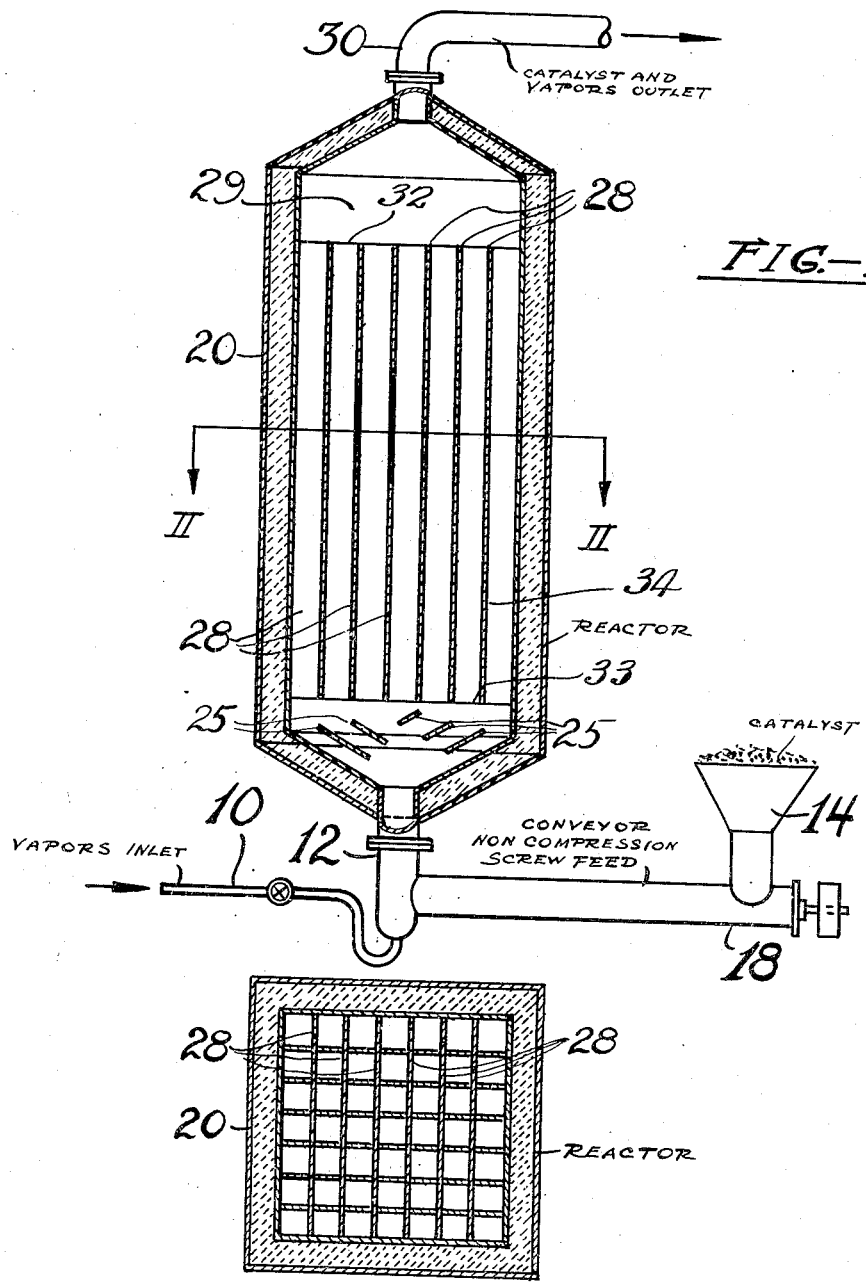

Oct. 3, 1944.  C. E. HEMMINGER  2,359,310
CHEMICAL PROCESS
Filed Feb. 18, 1941

FIG.-II

Charles E. Hemminger Inventor
By [signature] Attorney

Patented Oct. 3, 1944

2,359,310

UNITED STATES PATENT OFFICE 2,359,310

CHEMICAL PROCESS

Charles E. Hemminger, Westfield, N. J., assignor to Standard Oil Development Company, a corporation of Delaware Application February 18, 1941, Serial No. 379,398

10 Claims. (Cl. 196—52)

The present invention relates to a process and apparatus for carrying the process into effect for treating hydrocarbon oils, and more particularly it relates to improvements in the continuous cracking of hydrocarbon oils in a process where the powdered catalyst is suspended in the vapors during the reaction.

In the type of process which is herein described and claimed, the hydrocarbon oil contains the catalyst suspended therein during the reaction. The cold oil is vaporized and preheated to say a temperature of 825°–950° F., and the catalyst having a particle size of from about 10–80 microns is suspended in the vapors either before or after they are heated to the temperature indicated, and the reaction is then allowed to take place in a reaction zone which is ordinarily of the form of a cylindrical retort or a conical retort. In the case where the retort is substantially cylindrical, the catalyst may or may not be resident in the catalyst zone for the same period of time as do all portions thereof. For example, in a reactor of the type described, the flow of vapors containing catalyst is usually upward and its linear velocity is rather low, often being from 1–3 ft. per second. Where the vapors contain 10–20 lbs. of catalyst per cubic foot, a considerable amount of slippage or settling may take place as to some portions of the catalyst whereas other portions remain in the catalytic zone for a relatively short period of time. In other words, let us suppose that the average time of residence of the catalyst in the zone is ten seconds. It may be and often is the fact that a substantial portion of that catalyst, which is fresh or regenerated catalyst, remains in the reaction zone for a period of less than five seconds. It apparently passes straight through the reaction zone. This is a situation where the reaction zone is a hollow vessel and the path of the suspension is unobstructed within the reaction zone.

I have devised a method and apparatus for correcting the above deficiency in prior reactors, and I accomplish this result by means of baffles disposed within the reactor, which baffles cause the suspension to flow through the reaction zone in parallel or confined streams, and by this means I effect the result of preventing undue mixing and insure substantially equal time of residence of all particles of catalyst in the reaction zone.

My invention will be best understood by reference to the accompanying drawing, in which Figure I shows a vertical elevation partly in section of my improved reactor, and Figure II is a cross-section taken along the line II—II of Figure I.

Referring in detail to the drawing, hydrocarbon vapors heated to reaction conditions are discharged into the system shown through line 10 and thence into conduit 12. Meanwhile, catalyst, such as acid treated clay or natural or synthetic alumina silica or magnesia silica compositions, is discharged from hopper 14 into the casing of screw conveyor 16, which conveyor is preferably of the non-compression type. The conveyor discharges the powdered material into the bottom of conduit 12 where it becomes dispersed in the oil vapors also entering 12, and the dispersion then is forced upwardly through reactor 20 which reactor carries a plurality of baffle plates 28 which baffle plates, together with the inner walls of the reactor, form a plurality of cells or conduits through which the vapors ascend. Distributor plates 25 distribute the flow equally to the various tubes or sectors. It is believed to be obvious that the conduits and the distributor plates reduce the tendency of the catalyst to intermix (i. e., from top to bottom) within the reactor and the net effect is that the suspension passes upwardly in a plurality of parallel or confined streams of reduced cross-section. The effect of the baffles, together with the side walls, is to provide the equivalent of a plurality of pipes of relatively small diameter, say 3–5 inches, disposed in parallel. Although mixing of the catalyst from the top of the reactor to the bottom in eddy currents is prevented by the baffles which prevent or limit the eddy currents in the reactor, slippage of the gas and the particles exists. Consequently, by regulating the velocity from 1–5 feet per second, the differential times of contact of the catalyst and vapors can be varied at will. This being the case, it is possible to control the contact time between vapors and catalyst in the reactor by regulating the linear velocity of the suspension. The reaction vapors pass upwardly into free space 29 and thence are withdrawn from the system through pipe 30 leading to equipment where the catalyst is separated from the vapors, regenerated and returned to the system for reuse at least in part, while the vapors are delivered to fractionating equipment to recover desired fractions and a cycle stock which may be reprocessed. The preheating and subsequent fractionation of the hydrocarbon oil form no part of the present invention and these may be carried out according to any conventional method.

The prevention of mixing in a reactor is desirable because it has been found that in cracking of gas oil the amount of carbon on the catalyst in the initial stages of cracking influences the carbon formation. In case the carbon on the inlet catalyst is 1% and that on the outlet is 3%, if mixing is allowed, the average concentration is the same as the outlet, 3%, and almost all the cracking is carried out in the presence of 3% carbon. However, if mixing is prevented, part of the cracking will be with catalyst of 1% carbon and part with catalyst of 2% carbon. This reduction in carbon on catalyst during cracking is sufficient to decrease the carbon formation by from 25 to 50% for the gasoline formation.

Many modifications of the present invention may be made by those skilled in the art without departing from the spirit thereof. Perforated tube sheets 32 and 33 may be the terminals of a plurality of pipes or flues so disposed and arranged as to effect parallel flow of the fluid therethrough. For instance, an arrangement may be employed which is similar to the well-known fire tube steel boiler. Of course, it will be understood that the headers are tube sheets 32 and 33, are imperforate except at the respective ends of the conduits 34 where they are necessarily perforated and correspond in diameter and cross-sectional area to the cells or flue openings.

The invention is not limited to square cross-section of chamber or cells as illustrated but they may take any form. Also, the baffles need not be continuous but may be intermittent along the height to allow mixing from side to side to equalize pressures. This may be done by holes in the baffles or even using offset baffles not in line with one another.

What I claim is:

1. In the continuous contacting of vapors with solid catalytic materials in a process wherein the solid catalyst in powdered form is suspended in hot vapors during a reaction, the improvement which comprises forcing the hot vapors containing solid catalyst suspended therein into a reaction zone, causing the hot vapors and solid to flow upwardly through the reaction zone in a plurality of parallel confined streams of relatively small cross-sectional area separated only by vertical partitions and withdrawing the reaction products from the top of the reaction zone, the process being characterized by the feature that during the passage of the suspension through the reaction zone the velocity of the vapors is maintained low and due to slippage or settling of the catalyst the concentration of the catalyst in the vapors in the separate streams is relatively high to give the desired time of contact between the vapors and catalyst while at the same time limiting eddy currents and undesirable mixing in said reaction zone which would be obtained if an unobstructed reaction zone were used.

2. The process set forth in claim 1 in which the solid material is a powdered cracking catalyst and the vapors are hydrocarbons boiling substantially within the gas oil range.

3. The process set forth in claim 1 in which the velocity of the vapors passing through the reaction zone is from 1 to 5 feet per second.

4. The process set forth in claim 1 in which the solid catalyst is a hydrocarbon conversion catalyst and the vapors are hydrocarbons in a gaseous state.

5. A process as set forth in claim 1 wherein the suspension passing through said reaction zone as a plurality of confined streams has a relatively large density and the vapors contain about 10 to 20 pounds of catalyst per cubic foot.

6. In a process wherein the catalytic conversion of hydrocarbons is carried out by passing a stream of powdered catalyst suspended in a hydrocarbon in a gaseous state under reaction conditions upwardly in a vertically arranged reaction zone having a large cross section and wherein the velocity of the gaseous hydrocarbon is maintained low and due to slippage of the catalyst relatively high concentration of catalyst in gaseous hydrocarbon is obtained and wherein eddy currents are formed and undesirable mixing is obtained in said reaction zone, when unobstructed, the improvement which comprises providing said reaction zone with partitions to subdivide said zone into a plurality of vertical passageways so that the powdered catalyst and hydrocarbon pass upwardly through said reaction zone in a plurality of streams and under conditions to obtain settling of the catalyst in the gaseous hydrocarbon and to obtain relatively high concentration of catalyst in the gaseous hydrocarbon in the streams and the time of residence of all of the powdered catalyst in the plurality of streams in said reaction zone is substantially the same and undesirable mixing of the catalyst from the top of said reaction zone to the bottom thereof caused by eddy currents is limited and less carbonaceous material is deposited on the powdered catalyst per volume of the reaction product produced than if the enlarged reaction zone were used without the partitions.

7. In a process wherein the catalytic conversion of hydrocarbons is carried out by passing a stream of powdered catalyst suspended in a hydrocarbon in a gaseous state under reaction conditions upwardly in a vertically arranged reaction zone having a relatively large cross section and wherein the velocity of the gaseous hydrocarbon is maintained low and due to slippage or settling of the catalyst relatively high concentration of catalyst in hydrocarbon is obtained and wherein eddy currents are formed and undesirable mixing is obtained and a relatively large amount of solid carbonaceous material is deposited on the catalyst particles per volume of gasoline produced when an unobstructed reaction zone is used, the improvement which comprises subdividing said reaction zone into a plurality of vertical cells whereby undesirable mixing of the catalyst in said reaction zone caused by eddy currents is limited and less solid carbonaceous material is deposited on the catalyst particles per volume of gasoline produced during the conversion than if the enlarged reaction zone were used without the cells.

8. In a process wherein the catalytic conversion of hydrocarbons is carried out in the presence of powdered catalyst by passing a stream of powdered catalyst suspended in hydrocarbon vapors under reaction conditions upwardly in a vertically arranged reaction zone having a relatively large cross section and wherein the velocity of the vapors in said reaction zone is relatively low and due to slippage or settling of the catalyst the concentration of catalyst in the upflowing vapors in said reaction zone is relatively high and eddy currents are formed causing desirable and undesirable mixing of the catalyst in said reaction zone, the improvement which comprises subdividing the stream of powdered catalyst and hydrocarbon vapor into a plurality of separate streams for at least part of the height of said reaction zone to limit undesirable mixing and eddy currents and to have the time of residence of the powdered catalyst in the subdivided streams in said reaction zone substantially the same while at the same time maintaining a relatively low vapor velocity to permit some settling of the catalyst resulting in relatively high concentration of catalyst in the vapors in the separate streams.

9. In a process wherein gaseous fluid is contacted with a powdered contact solid by passing a stream of powdered solid suspended in a gaseous fluid under reaction conditions upwardly in a vertically arranged reaction zone having a relatively large cross section and wherein the velocity of the gaseous fluid is relatively low and due to slippage or settling of the solid the concentration of the solid in the upflowing gaseous fluid is relatively high and eddy currents are formed causing desirable and undesirable mixing of the solid and gaseous fluid, the improvement which comprises subdividing the stream of solid and gaseous fluid into a plurality of streams for at least part of the height of said reaction zone to limit undesirable mixing and eddy currents while maintaining a relatively low velocity of the gaseous fluid to permit some settling of the solid resulting in relatively high concentration of the solid in the gaseous fluid in the separate streams to give the desired time of contact between the solid and gaseous fluid.

10. In a process wherein gaseous fluid is contacted with a powdered contact solid by passing powdered solid and a gaseous fluid under reaction conditions into a vertically arranged reaction zone having a relatively large cross section and wherein the gaseous fluid flows upwardly through said reaction zone and wherein the velocity of the gaseous fluid is relatively low and due to slippage or settling of the solid the concentration of the solid in the upflowing gaseous fluid is relatively high and eddy currents are formed causing desirable and undesirable mixing of the solid and gaseous fluid, the improvement which comprises subdividing the reaction zone into a plurality of vertical cells so that the gaseous fluid is subdivided into a plurality of streams for at least part of the height of said reaction zone to limit undesirable mixing and eddy currents while maintaining a relatively low velocity of the gaseous fluid to permit some settling of the solid resulting in relatively high concentration of the solid in the gaseous fluid in the separate streams to give the desired time of contact between the solid and gaseous fluid.

CHARLES E. HEMMINGER.